United States Patent
Cho et al.

(10) Patent No.: US 9,290,075 B2
(45) Date of Patent: Mar. 22, 2016

(54) COUPLED TORSION BEAM AXLE TYPE SUSPENSION SYSTEM

(71) Applicant: Hyundai Motor Company, Seoul (KR)

(72) Inventors: Youn Hyung Cho, Seoul (KR); Jin-Ho Jung, Hwaseong-si (KR); Seon Pyung Kim, Seoul (KR); Jaekil Lee, Suwon-si (KR); Seong Hee Jeong, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/497,038

(22) Filed: Sep. 25, 2014

(65) Prior Publication Data

US 2015/0123368 A1    May 7, 2015

(30) Foreign Application Priority Data

Nov. 4, 2013    (KR) .................. 10-2013-0132956

(51) Int. Cl.
*B60G 21/05*    (2006.01)
*B60G 13/00*    (2006.01)

(52) U.S. Cl.
CPC ............ *B60G 21/052* (2013.01); *B60G 13/003* (2013.01); *B60G 2200/20* (2013.01); *B60G 2204/1434* (2013.01)

(58) Field of Classification Search
CPC ............... B60G 21/052; B60G 2204/1434; B60G 2200/20; B60G 2200/21; B60G 2200/31; B60G 13/003; B60G 13/005
See application file for complete search history.

(56) References Cited

U.S. PATENT DOCUMENTS

| | | | | |
|---|---|---|---|---|
| 4,834,416 A * | 5/1989 | Shimoe et al. | ........... | 280/124.13 |
| 5,683,098 A * | 11/1997 | VanDenberg | .......... | 280/124.116 |
| 6,047,978 A * | 4/2000 | Watanabe et al. | ...... | 280/124.106 |
| 7,273,218 B2 * | 9/2007 | Shin | ...................... | 280/124.116 |
| 8,485,540 B2 * | 7/2013 | Moon et al. | ............ | 280/124.128 |
| 2006/0273530 A1 * | 12/2006 | Zuber | .......................... | 280/5.52 |
| 2015/0123369 A1 * | 5/2015 | Jung et al. | .............. | 280/124.128 |
| 2015/0123370 A1 * | 5/2015 | Lee et al. | ............... | 280/124.128 |
| 2015/0123371 A1 * | 5/2015 | Lee et al. | ............... | 280/124.128 |
| 2015/0123372 A1 * | 5/2015 | Lee et al. | ............... | 280/124.128 |

FOREIGN PATENT DOCUMENTS

| | | |
|---|---|---|
| JP | 2001-039136 A | 2/2001 |
| JP | 2006-335118 A | 12/2006 |
| JP | 2013-052855 A | 3/2013 |

* cited by examiner

*Primary Examiner* — Laura Freedman
(74) *Attorney, Agent, or Firm* — Morgan, Lewis & Bockius LLP

(57) ABSTRACT

A coupled torsion beam axle type suspension system may include trailing arms respectively coupled to opposite ends of a torsion beam, and vehicle body-engaging units, each provided in a front end portion of a respective trailing arm and engaging the respective trailing arm with a vehicle body. Each vehicle body-engaging unit may includes a trailing arm bush that is coupled to a front end portion of the respective trailing arm, a link bracket disposed in front of the trailing arm bush and engaged with the trailing arm bush in a width direction of a vehicle, a vehicle body mounting bush disposed outside of the trailing arm bush and in front of the trailing arm bush, installed in the link bracket, and engaged with a lower part of the vehicle body in a height direction of the vehicle; and a damper connected to the link bracket and the vehicle body abutting the vehicle body mounting bush.

13 Claims, 8 Drawing Sheets

FIG. 3     (Related Art)

FIG. 4 (Related Art)
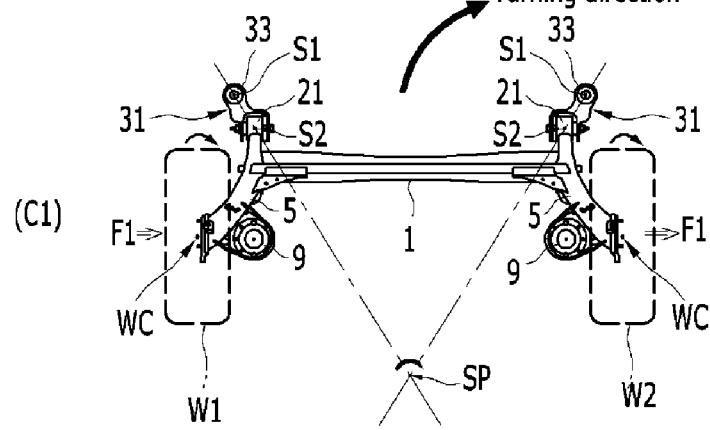
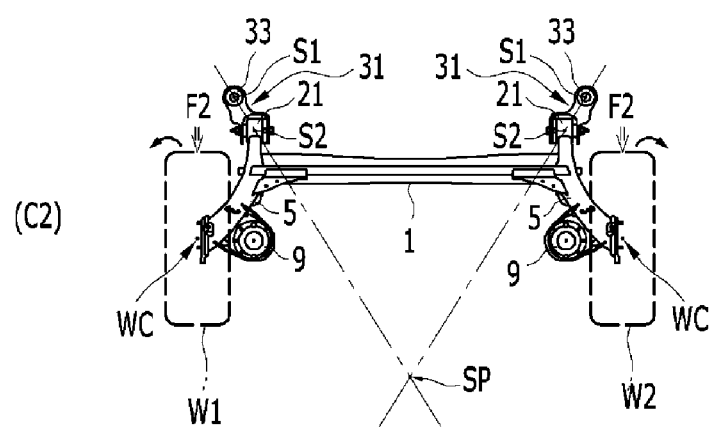
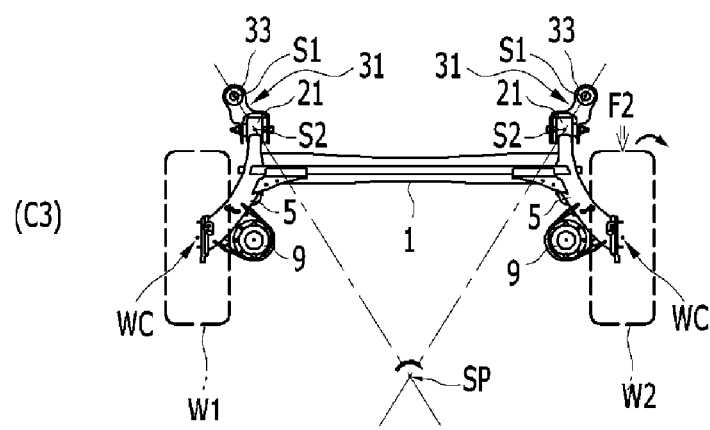

FIG. 7C11
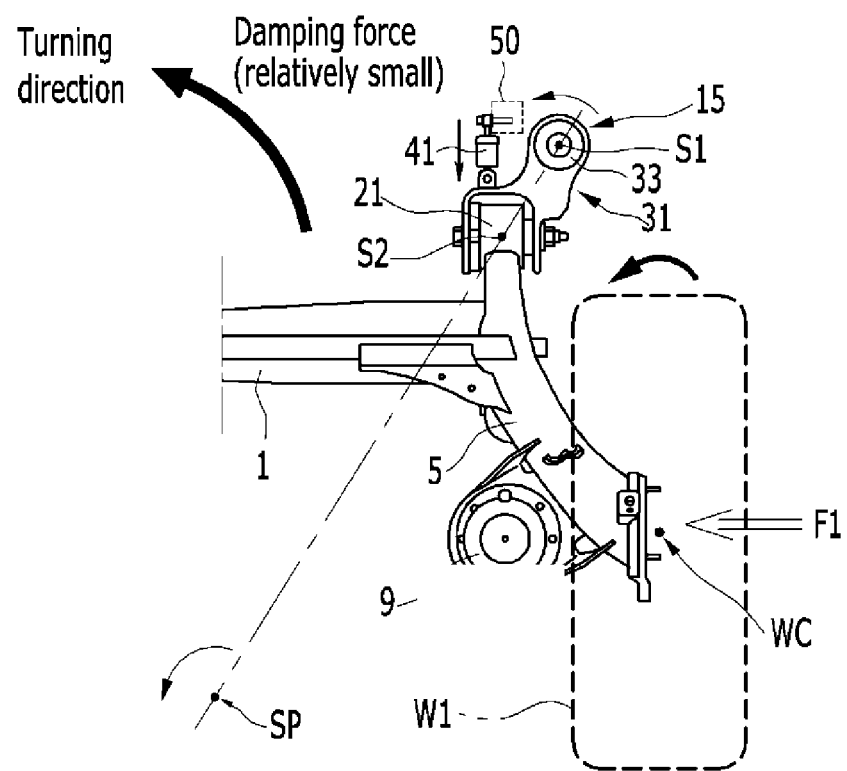

FIG. 7C12
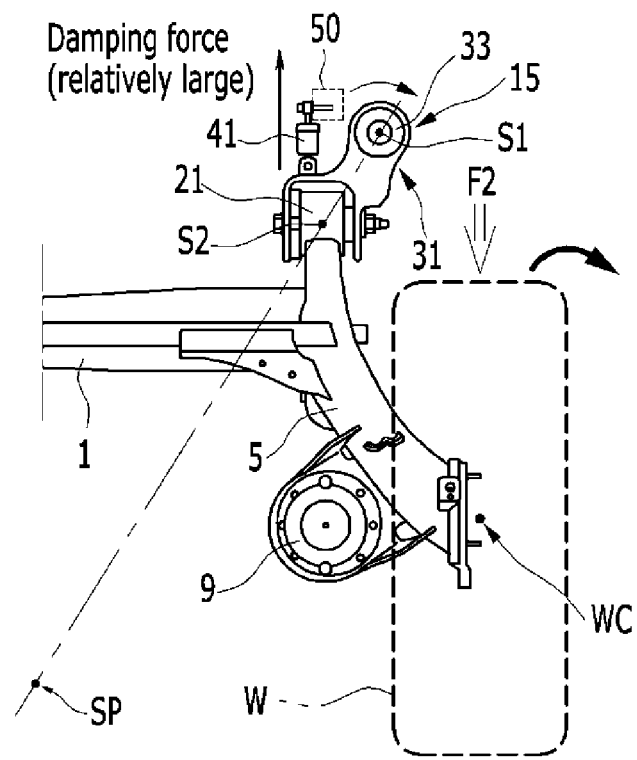

COUPLED TORSION BEAM AXLE TYPE SUSPENSION SYSTEM

CROSS-REFERENCE TO RELATED APPLICATION

The present application claims priority of Korean Patent Application Number 10-2013-0132956 filed on Nov. 4, 2013, the entire contents of which application are incorporated herein for all purposes by this reference.

BACKGROUND OF INVENTION

1. Field of Invention

The present invention relates to a coupled torsion beam axle type suspension system, and more particularly, to a coupled torsion beam axle type suspension system for simultaneously improving impact and roll characteristics of an outer rear wheel with respect to thrust and drag forces as well as controlling movement (e.g., toe) characteristics thereof with respect to a side force, when a vehicle turns.

2. Description of Related Art

Generally, despite a limitation in design performance factors such as ride comfort, driving stability, etc., a coupled torsion beam axle type suspension system (hereinafter referred to as a CTBA) has been primarily applied to rear wheel suspension systems for compact and mid-size cars, compared with independent-type suspension systems, because they have advantages of light weight and low production cost due to their simpler components.

FIG. 1 is a perspective view of a CTBA according to one example of the related art. Referring to FIG. 1, a CTBA according to one example of the related art is provided with a torsion beam 1 in a width direction of a vehicle, trailing arms 5 respectively coupled to opposite ends of the torsion beam 1, and carriers 3 for mounting wheel tires at the trailing arms 5.

A spring seat 9 for mounting a spring 7 thereon and a shock absorber pin 13 for coupling with a shock absorber 11 are provided at a rear inner portion of the trailing arm 5. In addition, a vehicle body-engaging unit 15 is provided at a front end portion of the trailing arm 5 to be coupled to a vehicle body. Each vehicle body-engaging unit 15 includes a trailing arm bush 21 that is coupled to the front end portion of the trailing arm 5, and a mounting bracket 23 that is coupled to the trailing arm bush 21 through a bolt 25.

According to the CTBA having the aforementioned configuration, wheels are deformed due to twisting deformation characteristics of the torsion beam 1, and in addition to that, a position of the trailing arm 5 and a configuration of the vehicle body-engaging unit 15 cause deformation of the wheels.

The vehicle should maintain an under-steering tendency in consideration of driving stability when it turns, and for this purpose, it is ideal that a rear outer wheel of a turning vehicle (hereinafter referred to as a rear outer wheel) should be induced to toe-in and a rear inner wheel of the turning vehicle (hereinafter referred to as a rear inner wheel) should be induced to toe-out.

However, the conventional CTBA has following problems in its movement.

FIG. 2 is a top plan view illustrating movement characteristics of the coupled torsion beam axle type suspension system, applied with a side force, according to one example of the related art. As shown in FIG. 2, though the CTBA according to one example of the related art is not freely moveable in terms of mechanics when applied with a side force F1, the entire CTBA rotates by the deformation of the trailing arm bush 21 and generates a toe angle at the rear outer wheel W1. That is, when the vehicle turns, the bumped rear outer wheel W1 is applied with the side force F1 and thus is likely to be induced to toe-out, while the rebounded rear inner wheel W2 is applied with the side force F1 and thus is likely to maintain the previous toe angle or to be induced to toe-in, such that the vehicle is over-steered in general and thus causes deterioration of turning stability.

As a mechanical instantaneous rotational center point SP of the CTBA with respect to the vehicle body (i.e., an intersection of lines that extend in engaging directions of the trailing arm bushes 21 engaged with the vehicle body) is positioned in front of the wheel centers WC, the rear outer wheel W1 has a tendency to toe-out due to the side force F1 while the rear inner wheel W2 has a tendency to toe-in due to the side force F1.

Recently, in order to solve such turning stability problems of the conventional CTBA, suspension systems are being developed to improve a structure of the vehicle body and the vehicle body-engaging unit of the trailing arm 5 such that the instantaneous rotational center point SP of the CTBA with respect to the vehicle body is positioned behind the wheel centers WC.

FIG. 3 is a top plan view of a coupled torsion beam axle type suspension system according to another example of the related art. Referring to FIG. 3 the improved CTBA according to the other example is provided with a link bracket 31 as a vehicle body-engaging unit 15 between a vehicle body and a trailing arm bush 21, such that an instantaneous rotational center point SP with respect to the vehicle body is positioned behind wheel centers WC.

That is, a rear end portion of the link bracket 31 is parallelly engaged with the trailing arm bush 21 in a width direction of the vehicle, and a front end portion thereof is provided with a vehicle body-mounter 33 that is freely rotatable with respect to the vehicle body in a rotating direction, thereby being engaged with one lower portion of the vehicle body.

In this case, the vehicle body-mounter 33 is coupled to the trailing arm bush 21 through the link bracket 31 and is engaged with the vehicle body in the height direction of the vehicle, such that it is engaged with the vehicle body at a front end portion of the link bracket 31 in the width direction of the vehicle.

Thus, the instantaneous rotational center point SP of the CTBA with respect to the vehicle body is formed at an intersection of the extending lines that connect centers S1 of the mounter 33 with centers S2 of the trailing arm bushes 21, and is positioned behind the wheel centers WC.

As such, in the CTBA according to the current example, the instantaneous rotational center point SP with respect to the vehicle body is positioned behind the wheel centers WC, such that it has following movement characteristics with respect to the side force F1 and the thrust and drag forces.

FIGS. 4 C1, C2, and C3 are top plan views illustrating movement characteristics of the coupled torsion beam axle type suspension system, applied with the side force and the thrust and drag forces, according to another example of the related art.

In FIG. 4 C1, when rear wheels are applied with the side force F1, the bumped rear outer wheel is induced to toe-in while the rebounded rear outer turning wheel W2 maintains a set toe-in angle or is induced to toe-out, such that the vehicle is generally under-steered to secure the turning stability.

Meanwhile, the CTBA is induced to rotate based on the instantaneous rotational center point SP when the rear wheels are applied with the thrust and drag forces F2 as well as the side force F1. That is, in FIG. 4 C2, in the CTBA according to another example, in a double impact environment in which the rear wheels are simultaneously applied with the thrust and drag forces, such as when the vehicle brakes or passes over a speed bump, rotation of the CTBA is offset by symmetrical rotation of the rear wheels, thereby guaranteeing the driving stability.

However, in FIG. 4 C3, in a single impact environment in which one of the rear wheels is asymmetrically applied with the thrust and drag forces F2, the corresponding rear wheel is induced to toe-out which makes the movement characteristics of the CTBA unstable in general, thereby deteriorating the driving stability as in the previous example according to the related art.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

A coupled torsion beam axle type suspension system according to various aspects of the present invention may include trailing arms respectively coupled to opposite ends of a torsion beam, and vehicle body-engaging units, each provided in a front end portion of a respective trailing arm and engaging the respective trailing arm with a vehicle body, wherein each vehicle body-engaging unit may include a trailing arm bush that is coupled to a front end portion of the respective trailing arm, a link bracket disposed in front of the trailing arm bush and engaged therewith in a width direction of a vehicle, a vehicle body mounting bush disposed outside of the trailing arm bush and in front thereof, installed in the link bracket, and engaged with a lower part of the vehicle body in a height direction of the vehicle, and a damper connected to the link bracket and the vehicle body abutting the vehicle body mounting bush.

The link bracket may include a pocket portion formed to be inserted by and engaged with the trailing arm bush, and a horizontal portion formed outside of the pocket portion and in front thereof and installed with the vehicle body mounting bush. The damper may be connected to an inner front end portion of the link bracket and the vehicle body and may output a damping force proportional to a speed of applied force. The damper may be connected to the inner front end portion of the link bracket and the vehicle body through a mounting bush or a ball joint. An extending line that passes a center of the vehicle body mounting bush and a center of the trailing arm bush may form an acute angle with a center line that passes a center of the trailing arm bush in a length direction of the vehicle body, and an instantaneous rotational center point of the CTBA at which the extending line and another extending line passing may be set to be positioned behind wheel centers. The vehicle body mounting bush may be connected to a bottom surface of a side member of the vehicle body.

A coupled torsion beam axle type suspension system (CTBA) according to various other aspects of the present invention may include trailing arms respectively coupled to opposite ends of a torsion beam and vehicle body-engaging units, each provided in a front end portion of a respective trailing arm and engaging the respective trailing arm with a vehicle body, wherein each vehicle body-engaging unit may include a trailing arm bush coupled to a front end portion of the respective trailing arm, a link bracket disposed in front of the trailing arm bush and engaged therewith, a vehicle body mounting bush installed in the link bracket, and engaged with a lower part of the vehicle body in a height direction of the vehicle, and a damper connected to the link bracket and the vehicle body abutting the vehicle body mounting bush, wherein an instantaneous rotational center point of the CTBA at which extending lines passing centers of the vehicle body mounting bushes and centers of the trailing arm bushes may be set to be positioned behind wheel centers.

The link bracket may include a pocket portion formed to be inserted by and engaged with the trailing arm bush, and a horizontal portion formed outside of the pocket portion and in front thereof and installed with the vehicle body mounting bush. The damper may be connected to an inner front end portion of the link bracket and the vehicle body and outputs a damping force proportional to a speed of applied force. The damper may be connected to the inner front end portion of the link bracket and the vehicle body through a mounting bush or a ball joint. An extending line that passes a center of the vehicle body mounting bush and a center of the trailing arm bush may form an acute angle with a center line that passes a center of the trailing arm bush in a length direction of the vehicle body. The vehicle body mounting bush may be connected to a bottom surface of a side member of the vehicle body.

According to various aspects of the present invention, as the link bracket is applied and the instantaneous rotational center point SP with respect to the vehicle body is positioned behind wheel centers WC, the outer rear wheel is induced to toe-in and the inner rear wheel is induced to toe-out by the side force when the vehicle turns, thereby securing the turning stability.

In addition, in a single impact situation when one of the rear-wheels is asymmetrically applied with the thrust and drag forces, such as when driving on a rough road, the instantaneous rotational center point CP of the rotation link with respect to the vehicle body varies and thus the instantaneous rotational center point of the CTBA is moved outside of a line of action where the thrust and drag forces are applied, thereby decreasing the amount of toe-out. That is, the amount of rotation of the corresponding rear wheel in a toe-out direction is decreased to secure the overall driving stability of the CTBA.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 4 C1, C2, and C3 are top plan views illustrating movement characteristics of the coupled torsion beam axle type suspension system, applied with the side force and thrust and drag forces, according to another example of the related art.

FIG. 7, including FIGS. 7C11 and 7C12, is a top plan view illustrating movement characteristics of an exemplary coupled torsion beam axle type suspension system, applied with the thrust and drag forces according to the present invention.

DETAILED DESCRIPTION

Figure 1:
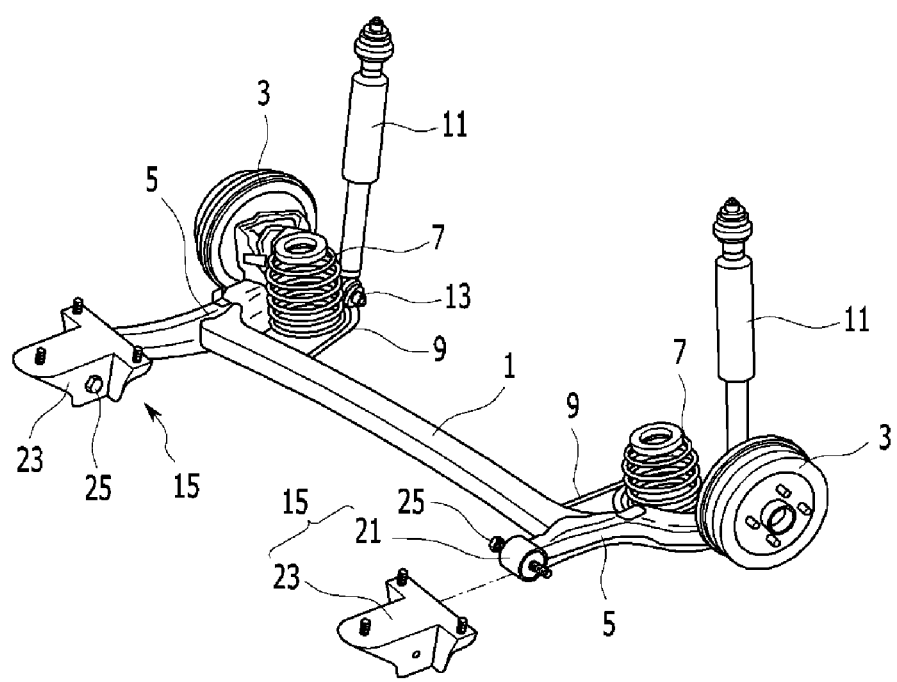
FIG. 1 is a perspective view of a coupled torsion beam axle type suspension system according to one example of the related art.
Figure 2:
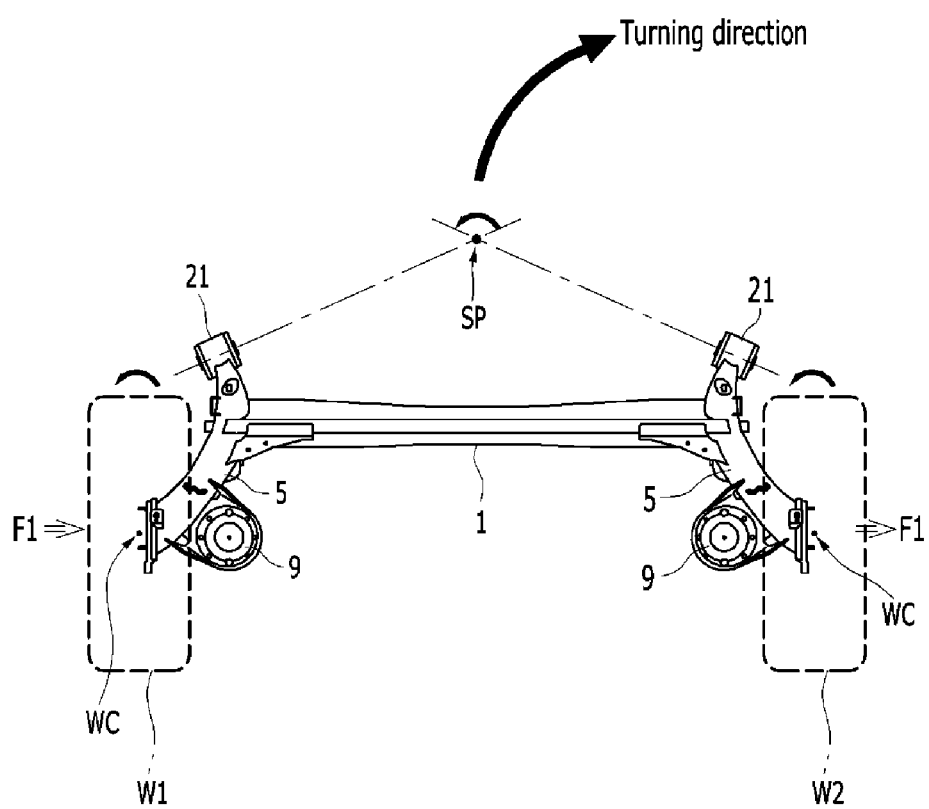
FIG. 2 is a top plan view illustrating movement characteristics of the coupled torsion beam axle type suspension system, applied with a side force, according to one example of the related art.
Figure 3:
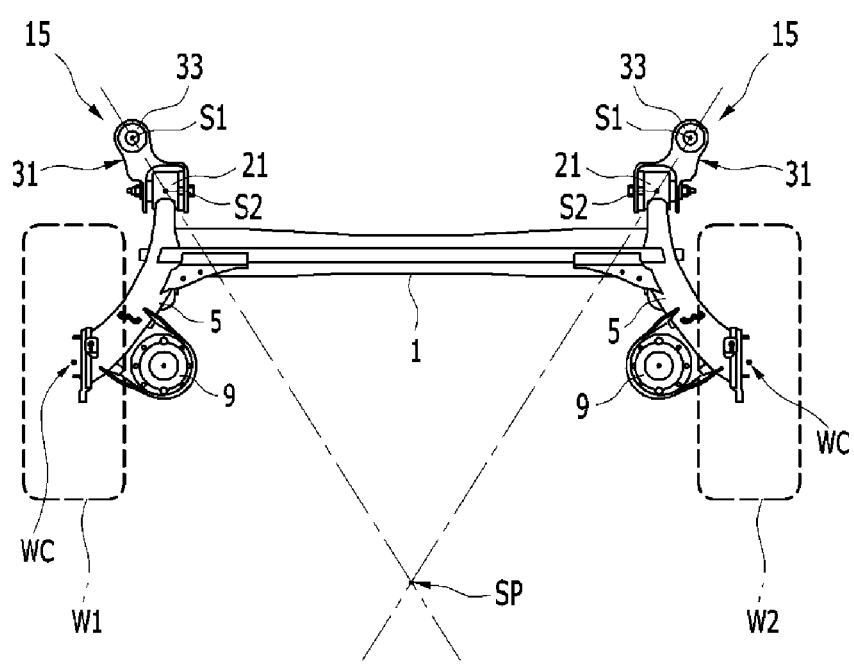
FIG. 3 is a top plan view of a coupled torsion beam axle type suspension system according to another example of the related art.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The size and thickness of each component illustrated in the drawings are shown for ease of description and the present invention is not limited thereto, and the thicknesses of portions and regions are exaggerated for clarity. In addition, parts that are irrelevant to the description are omitted to clearly describe the exemplary embodiments of the present invention, and like reference numerals designate like elements throughout the specification, which also applies to the related art.

Figure 5:
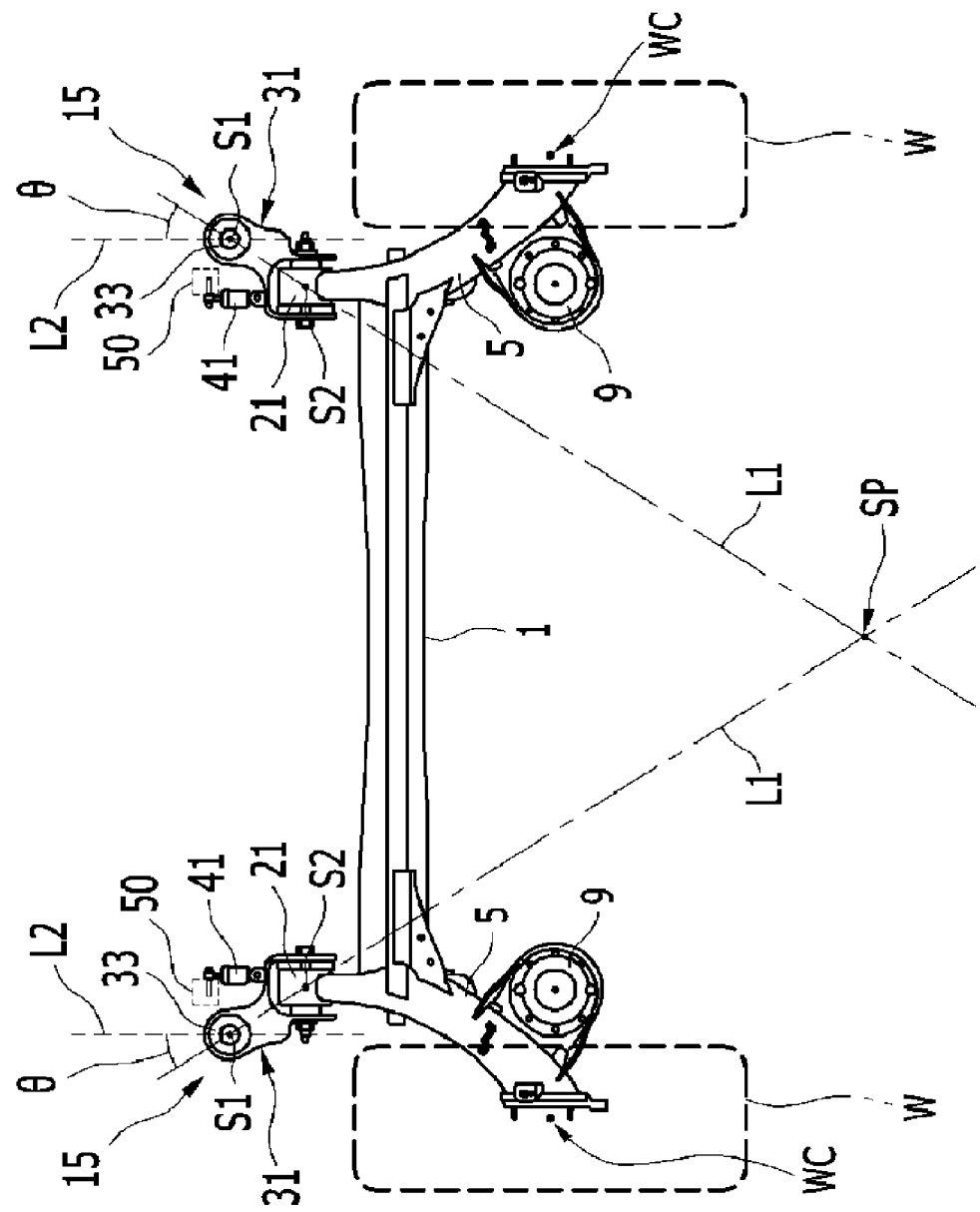
FIG. 5 is a top plan view of an exemplary coupled torsion beam axle type suspension system according to the present invention.

Further, when describing exemplary embodiments of the present invention, for ease of description, it is assumed that an upper portion of FIG. 5 is defined as a front direction and a lower portion is defined as a rear direction. A coupled torsion beam axle type suspension system according to various embodiments of the present invention is symmetrically or substantially symmetrically provided in each rear wheel of a vehicle, and for ease of description, a description of one side will be applicable to the other side.

Figure 6:
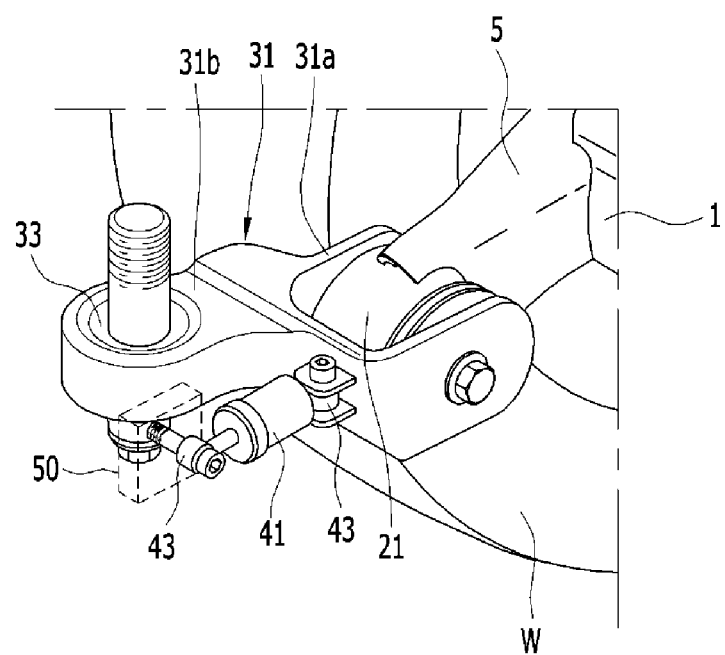
FIG. 6 is an enlarged perspective view of an exemplary vehicle body-engaging unit applicable to an exemplary coupled torsion beam axle type suspension system according to the present invention.

FIG. 5 is a top plan view of a coupled torsion beam axle type suspension system according to various embodiments of the present invention, FIG. 6 is an enlarged perspective view of a vehicle body-engaging unit applicable to the coupled torsion beam axle type suspension system according to various embodiments of the present invention, and FIG. 7, including FIGS. 7C11 and 7C12, is a top plan view illustrating movement characteristics of the coupled torsion beam axle type suspension system, applied with the thrust and drag forces according to various embodiments of the present invention.

Referring to FIG. 5, a coupled torsion beam axle type suspension system (hereinafter referred to as a CTBA) is provided with a torsion beam 1 in a width direction of a vehicle, and trailing arms 5 respectively fixed to opposite ends of the torsion beam 1.

A spring seat 9 is formed at a rear inner side of the trailing arms 5 to mount a spring. A vehicle body-engaging unit 15 is provided at a front end portion of the trailing arms 5 to be coupled to a vehicle body 50.

In the CTBA according to various embodiments of the present invention, each vehicle body-engaging unit 15 includes a trailing arm bush 21, a link bracket 31, a vehicle body mounting bush 33 and a damper 41. The trailing arm bush 21 is coupled to the front end portion of the trailing arm 5. The link bracket 31 is disposed in front of the trailing arm bush 21 and is parallelly engaged therewith in the width direction of the vehicle.

In this case, referring to FIG. 6, a pocket portion 31a is formed at a rear end portion of the link bracket 31 to be inserted by and engaged with the trailing arm bush 21, a horizontal portion 31b is integrally formed outside of the pocket portion 31a in front thereof and installed with the vehicle body mounting bush 33.

The vehicle body mounting bush 33 is disposed outside of the trailing arm bush 21 in front thereof, and is engaged with a lower portion of the vehicle body 50, that is a lower portion of a side member in the height direction of the vehicle.

An extending line L1 that passes a center S1 of the vehicle body mounting bush 33 and a center S2 of the trailing arm bush 21 forms an acute angle θ with a center line L2 that passes a center of the trailing arm bush 21 in the length direction of the vehicle body 50; and an instantaneous rotational center point SP of the CTBA at which the extending lines L1 passing is set to be positioned behind wheel centers WC.

The damper 41 is connected to the link bracket 31 and the vehicle body 50 abutting the vehicle body mounting bush 33. The damper 41 is connected to an inner front end portion of the link bracket 31 and the vehicle body 50 through a mounting bush 43 to allow operations of the damper 41 in movement of the link bracket 31. In various embodiments of the present invention, a ball joint may be used for connecting the damper 41 to the inner front end portion of the link bracket 31 and the vehicle body 50. The damper 41 outputs damping force proportional to speed of applied force.

The thrust and drag forces F2, such as when the vehicle is driven on a rough road, are applied in relatively large amount in short time. However, the side force F1, such as when the vehicle turns, is applied in relatively small amount in long time.

According to characteristics of applied forces as thrust and drag forces F2 and the side force F1, the damper 41 outputs damping force proportional to speed of the applied force. That is, the damper 41 suppresses rotation of link bracket 31 with relatively strong damping force when the thrust and drag forces F2, with high speed, are applied, but the damper 41 suppresses rotation of link bracket 31 with relatively small damping force when the side force F1, with slow speed, is applied.

The vehicle body mounting bush 33 is mounted on the link bracket 31 for mounting the CTBA to the vehicle body 50, which is the lower portion of the side member.

The instantaneous rotational center point SP of the CTBA with respect to the vehicle body 50 is formed at an intersection of the extending lines L1 that connect centers S1 of the vehicle mounting bush 33 with centers S2 of the trailing arm bushes 21, and is positioned behind the wheel centers WC.

Accordingly, the CTBA according to various embodiments of the present invention, in which the centers S1 and S2 of the vehicle body mounting bushes 33 and the trailing arm bushes 21 are used as pivot points by the link brackets 31, forms a four-node link apparatus between the trailing arms 5 and the vehicle body 50.

Referring to C11 of FIG. 7, in the CTBA, when rear wheels are applied with the side force F1, such as when the vehicle turns, the rear outer wheel W1 that is rotated and bumped based on the instantaneous rotational center point SP, is induced to toe-in such that the vehicle is generally under-steered to secure the turning stability. In this case, the damper 41 outputs relatively small damping force due to relatively lower speed of the side force F1, so that the rotation of the link bracket 31 is slightly suppressed.

Referring to C12 of FIG. 7, in the CTBA, in a single impact environment in which one of the rear wheels is asymmetrically applied with the thrust and drag forces F2, or in a double impact environment in which the rear wheels are simultaneously applied with the thrust and drag forces, the damper 41 outputs relatively large damping force due to relatively high speed of the force F2, so that the rotation of the link bracket 31 is strongly suppressed. Such that the amount of rotation of the link bracket 31 is decreased in the toe-out direction to secure the overall driving stability of the CTBA.

For convenience in explanation and accurate definition in the appended claims, the terms "upper" or "lower", "front" or "rear", "inner" or"outer", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A coupled torsion beam axle type suspension system (CTBA), comprising:
    trailing arms respectively coupled to opposite ends of a torsion beam; and
    vehicle body-engaging units, each provided in a front end portion of a respective trailing arm and engaging the respective trailing arm with a vehicle body, wherein
    each vehicle body-engaging unit includes:
    a trailing arm bush that is coupled to the front end portion of the respective trailing arm;
    a link bracket disposed in front of the trailing arm bush and engaged therewith in a width direction of a vehicle;
    a vehicle body mounting bush disposed outside of the trailing arm bush and in front thereof, installed in the link bracket, and engaged with a lower part of the vehicle body in a height direction of the vehicle; and
    a damper connected to the link bracket and the vehicle body abutting the vehicle body mounting bush.

2. The system of claim 1, wherein the link bracket includes:
    a pocket portion formed to be inserted by and engaged with the trailing arm bush; and
    a horizontal portion formed outside of the pocket portion and in front thereof and installed with the vehicle body mounting bush.

3. The system of claim 2, wherein:
    an extending line that passes through a center of the vehicle body mounting bush and a center of the trailing arm bush forms an acute angle with a center line that passes through a center of the trailing arm bush in a length direction of the vehicle body; and
    an instantaneous rotational center point of the CTBA at which the extending line and another extending line pass through is set to be positioned behind wheel centers.

4. The system of claim 1, wherein the damper is connected to an inner front end portion of the link bracket and the vehicle body and outputs a damping force proportional to a speed of applied force.

5. The system of claim 4, wherein the damper is connected to the inner front end portion of the link bracket and the vehicle body through a mounting bush or a ball joint.

6. The system of claim 1, wherein:
    an extending line that passes through a center of the vehicle body mounting bush and a center of the trailing arm bush forms an acute angle with a center line that passes through a center of the trailing arm bush in a length direction of the vehicle body; and
    an instantaneous rotational center point of the CTBA at which the extending line and another extending line pass through is set to be positioned behind wheel centers.

7. The system of claim 1, wherein the vehicle body mounting bush is connected to a bottom surface of a side member of the vehicle body.

8. A coupled torsion beam axle type suspension system (CTBA), comprising:
    trailing arms respectively coupled to opposite ends of a torsion beam; and
    vehicle body-engaging units, each provided in a front end portion of a respective trailing arm and engaging the respective trailing arm with a vehicle body, wherein
    each vehicle body-engaging unit includes:
    a trailing arm bush coupled to the front end portion of the respective trailing arm;
    a link bracket disposed in front of the trailing arm bush and engaged therewith;
    a vehicle body mounting bush installed in the link bracket, and engaged with a lower part of the vehicle body in a height direction of a vehicle; and
    a damper connected to the link bracket and the vehicle body abutting the vehicle body mounting bush;
    wherein an instantaneous rotational center point of the CTBA at which extending lines passing through centers of the vehicle body mounting bushes and centers of the trailing arm bushes pass through is set to be positioned behind wheel centers.

9. The system of claim 8, wherein the link bracket includes:
    a pocket portion formed to be inserted by and engaged with the trailing arm bush; and
    a horizontal portion formed outside of the pocket portion and in front thereof and installed with the vehicle body mounting bush.

10. The system of claim 8, wherein the damper is connected to an inner front end portion of the link bracket and the vehicle body and outputs a damping force proportional to a speed of applied force.

11. The system of claim 10, wherein the damper is connected to the inner front end portion of the link bracket and the vehicle body through a mounting bush or a ball joint.

12. The system of claim 8, wherein an extending line that passes through the center of the vehicle body mounting bush and the center of the trailing arm bush forms an acute angle with a center line that passes the center of the trailing arm bush in a length direction of the vehicle body.

13. The system of claim 8, wherein the vehicle body mounting bush is connected to a bottom surface of a side member of the vehicle body.

* * * * *